United States Patent
Doshi et al.

(10) Patent No.: US 6,622,356 B2
(45) Date of Patent: Sep. 23, 2003

(54) ATTACHMENT ASSEMBLY FOR CLOSED-LOOP ATTACHMENTS

(75) Inventors: Monish J. Doshi, Irvine, CA (US); James T. Hartley, Tustin, CA (US); Israel V. Castaneda, Huntington Beach, CA (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 09/872,202

(22) Filed: Jun. 1, 2001

(65) Prior Publication Data
US 2002/0178558 A1 Dec. 5, 2002

(51) Int. Cl.$^7$ .................................................. A41F 1/02
(52) U.S. Cl. ........................ 24/660; 24/115 K; 385/53; 385/55; 220/203.09
(58) Field of Search ................ 24/115 K, 660, 24/16 PB, 102 R, 129 R; 385/53, 55, 60, 78; 220/200, 203.09, 253, 324, DIG. 19, DIG. 32, DIG. 33; 269/130, 131; 242/615.2, 615.3

(56) References Cited

U.S. PATENT DOCUMENTS

| | | | | |
|---|---|---|---|---|
| 3,867,046 A | * | 2/1975 | Fox ............................. 403/210 |
| 4,043,006 A | * | 8/1977 | Williams et al. ........... 24/102 E |
| 4,411,040 A | * | 10/1983 | Sharrow et al. ......... 15/104.94 |
| 4,495,690 A | * | 1/1985 | McNeal ....................... 29/468 |
| 4,915,451 A | * | 4/1990 | Forget et al. ............. 280/801.1 |
| 4,923,272 A | * | 5/1990 | Cuda ............................. 385/55 |
| 4,979,792 A | * | 12/1990 | Weber et al. ................. 385/53 |
| 5,090,583 A | * | 2/1992 | Hoffman et al. ............ 215/250 |
| 5,210,810 A | * | 5/1993 | Darden et al. ................. 385/78 |
| 5,276,752 A | * | 1/1994 | Gugelmeyer et al. ......... 385/55 |
| 5,291,844 A | * | 3/1994 | McCormick ............. 114/39.12 |
| 5,318,158 A | * | 6/1994 | Seasholtz ................... 191/12 R |
| 5,704,447 A | * | 1/1998 | Doyle .......................... 182/90 |
| 5,738,285 A | * | 4/1998 | Anderson .................... 137/800 |
| 5,755,419 A | * | 5/1998 | Gearhart et al. ......... 248/176.1 |
| 6,059,136 A | * | 5/2000 | Lin .......................... 220/212.5 |
| 6,067,942 A | * | 5/2000 | Fernandez .................. 119/802 |
| 6,099,437 A | * | 8/2000 | DeMers ....................... 482/46 |
| 6,120,074 A | * | 9/2000 | Hamrick ...................... 294/74 |
| 6,129,490 A | * | 10/2000 | Erskine et al. .............. 410/110 |
| 6,260,241 B1 | * | 7/2001 | Brennan ................... 24/135 R |
| 6,325,092 B1 | * | 12/2001 | Pirkle .................... 137/315.39 |

* cited by examiner

Primary Examiner—J. J. Swann
Assistant Examiner—Andre'L. Jackson
(74) Attorney, Agent, or Firm—Thomas N. Twomey

(57) ABSTRACT

An attachment assembly and method for attaching closed loops of lanyards to dust covers. The attachment assembly and method eliminate the need for tools and enable plastic and other materials to be used in the construction of the lanyard. In one embodiment, the attachment assembly includes a groove and a flange with a slot in it. A closed loop can be attached to the dust cover using this attachment assembly by placing a section of the closed loop in the slot and then rotating the dust cover relative to the closed loop.

19 Claims, 5 Drawing Sheets

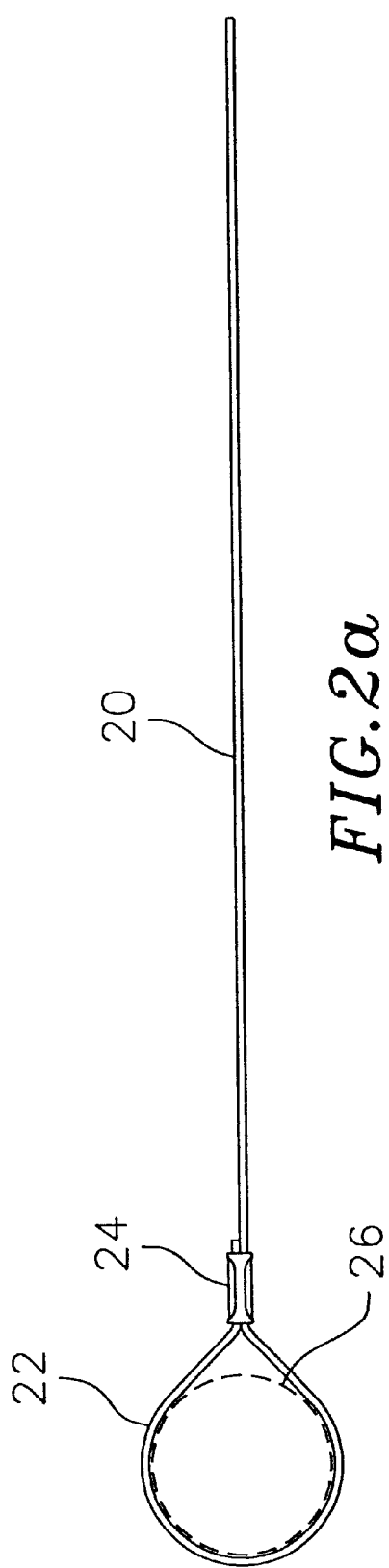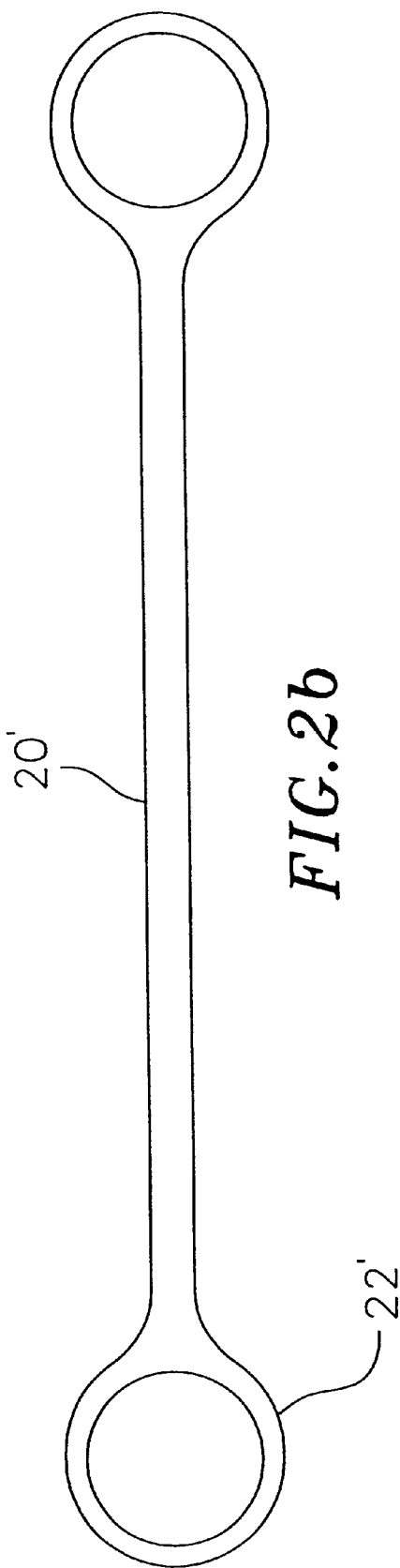

ATTACHMENT ASSEMBLY FOR CLOSED-LOOP ATTACHMENTS

FIELD OF THE INVENTION

The present invention relates generally to methods of attaching lanyards and more specifically to a method and attachment assembly for attaching preformed loops to dust covers.

BACKGROUND OF THE INVENTION

Dust covers are used to protect connectors in a variety of electrical and optical applications. Dust covers are of particular importance in optical applications. An exposed fiber end may be damaged by adverse environmental hazards, and the accumulation of dust and dirt may impair the optical transmission capabilities of the fiber. Due to the importance of protecting optical fibers, dust covers are often attached to the connector using a lanyard to ensure that they are not lost. The most common method of attaching lanyards to dust covers was to use a wire rope, a metal sleeve and a special tool. At the time of assembling the optical connector and the dust cover, the lanyard was formed into a loop around the dust cover. Then the loop was secured using the metal sleeve and tool. This process was costly and time consuming. Another disadvantage of using this method was that it was difficult for customers to install replacement lanyards. If the lanyard broke, the customer was required to handle small parts, order a special tool and follow detailed installation instructions to form a properly sized loop. Therefore, there is a need for a method of attaching lanyards to dust covers that does not involve using tools.

SUMMARY OF INVENTION

In accordance with practice of the present invention, a device configured for attaching a preformed loop of a selected internal diameter to the device is provided. The device includes a flange located in a first plane, a groove adjacent the flange and a slot in the flange disposed at an angle to the first plane. The shape of the groove and angle of the slot enable the preformed loop to be guided into the groove by rotation of the loop relative to the structure. The shapes of the flange and the groove substantially prevent unwanted detachment of the preformed loop from the groove.

BRIEF DESCRIPTION OF THE DRAWINGS

FIG. 2a is a semi-schematic elevational view of a wire lanyard including a preformed loop;

FIG. 2b is a semi-schematic elevational view of a plastic lanyard including a preformed loop.

FIG. 4b is an enlarged view of the slot of FIG. 4a.

DETAILED DESCRIPTION OF THE INVENTION

Although detailed illustrative embodiments are disclosed herein, other suitable structures for practicing the invention may be employed and will be apparent to persons of ordinary skill in the art. Consequently, specific structural and functional details disclosed herein are representative only; they merely describe exemplary embodiments of the invention.

Figure 1:
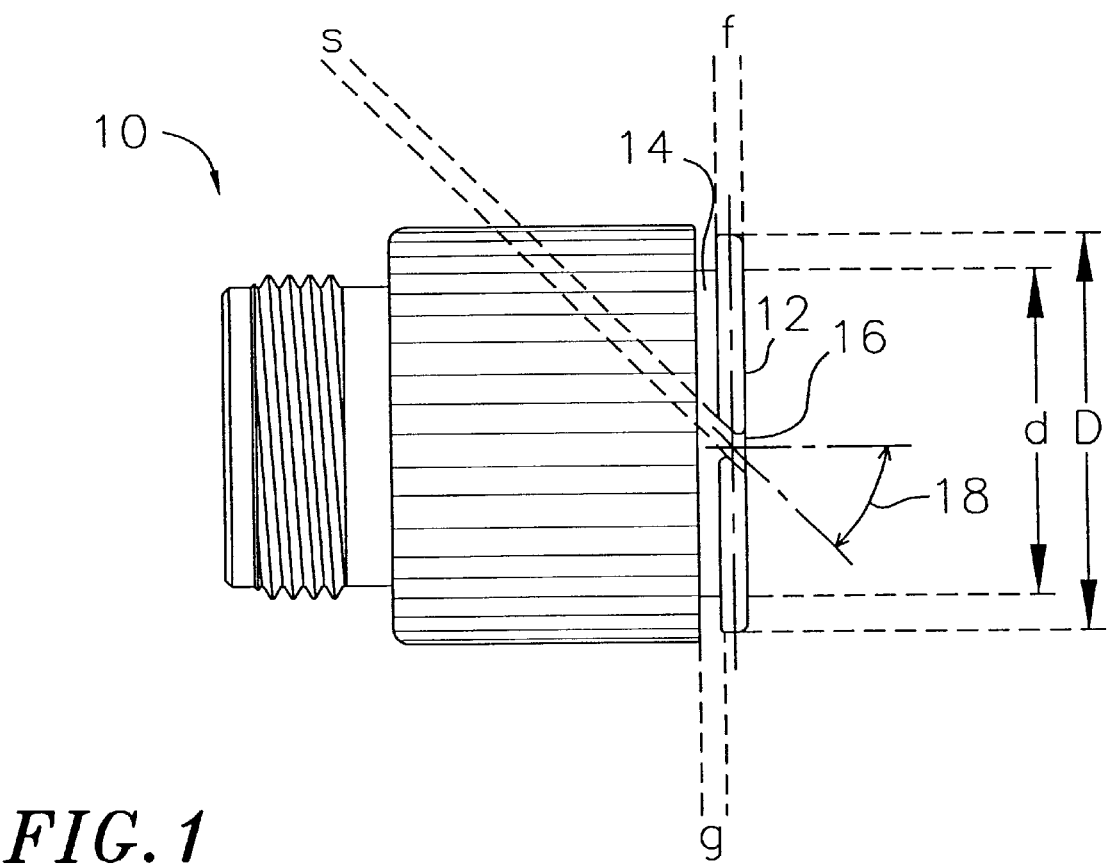
FIG. 1 is a semi-schematic side elevational view of a dust cover including a groove and a flange with a slot in it provided in accordance with practice of the present invention.

Turning to FIG. 1, a preferred embodiment of a dust cover 10 provided in accordance with practice of the present invention is illustrated. The structural features of the dust cover 10 that comprise an assembly for enabling the attachment of a preformed lanyard, include a flange 12, a groove 14 adjacent the flange and a slot 16 through the flange. The slot 16 forms an angle 18, which is defined relative to the centerline of the dust cover 10. In one preferred embodiment, the attachment assembly portion of the dust cover is manufactured by lathing a round rod of aluminum. The lathe turns down the diameter of the rod to create the flange 12 and the groove 14 and then a milling machine is used to create the slot 16. Anodizing the aluminum rod completes the manufacturing process. However, other methods of construction that result in the creation of a groove and a flange with a slot in it can also be used.

Turning now to FIG. 2a in addition to FIG. 1, there is shown a lanyard 20 with a preformed loop 22 which can be attached to the dust cover 10 by means of the attachment assembly. The lanyard 20 is typically constructed from a flexible nylon covered wire formed into a loop using a crimping sleeve 24. However, preformed plastic lanyards can also be used. Turning now to FIG. 2b, an embodiment of a plastic lanyard 20' provided in accordance with practice of the present invention comprising a preformed loop 22' is illustrated.

Referring back to FIG. 1, the external surface of the dust cover 10 is preferably cylindrical, however, any shape is appropriate. The flange 12 is preferably a disk at one end of the dust cover possessing a diameter larger than the inside diameter of the preformed loop 22. However, the flange 12 can be any shape so long as the combination of the flange shape and size prevents the removal of the lanyard 20 without the use of the attachment assembly once it has been attached to the dust cover. The groove 14 is preferably a circular groove around the dust cover comprising a hub with a diameter "d" located adjacent the flange 12. However, the groove 14 can be any shape so long as its shape can be contained within the preformed loop 22. The groove 14 is constructed so that the hub diameter "d" is less than the internal diameter of the preformed loop 22, when it is substantially formed as a circle as shown by the imaginary line 26 in FIG. 2a.

Turning now to FIGS. 3a–3d, a process provided in accordance with practice of the present invention for attaching the preformed loop 22 to the dust cover 10 is illustrated. A portion of the preformed loop 22 is placed in the slot 16. The dust cover 10 and the preformed loop 22 are then rotated relative to each other and the motion of rotation guides the preformed loop 22 into the groove 14. The direction of rotation required to attach the preformed loop 22 is as shown in FIGS. 3a–3d.

Figure 3A:
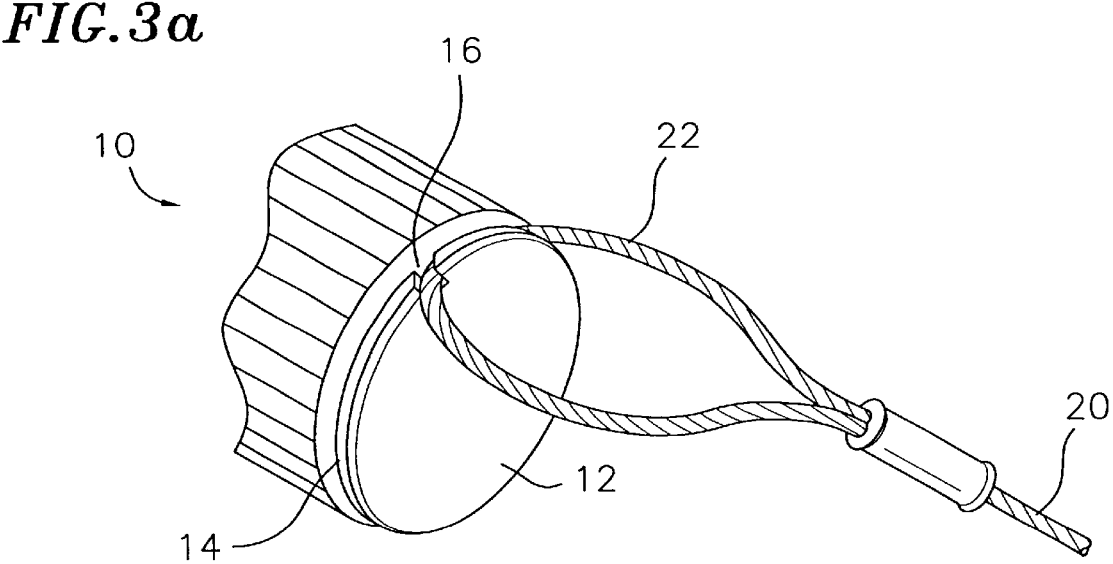
FIGS. 3a–3d are perspective views illustrating a method of attaching a preformed lanyard to a dust cover provided in accordance with practice of the present invention.
Figure 3B:
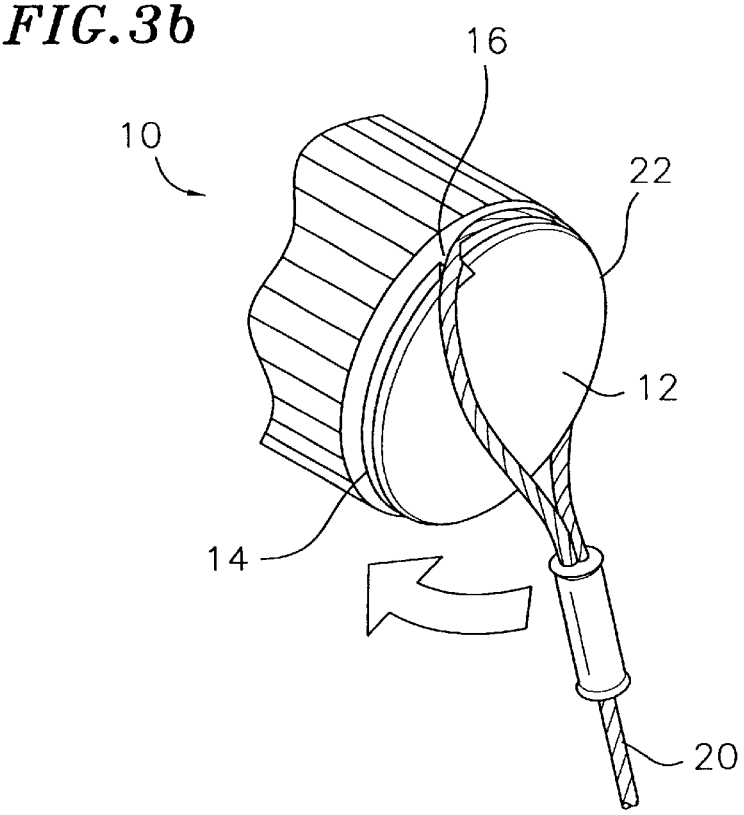
Figure 3C:
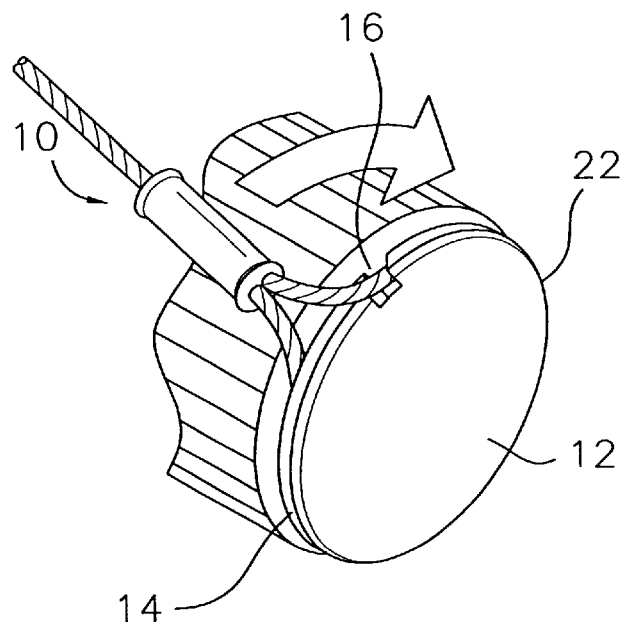
Figure 3D:
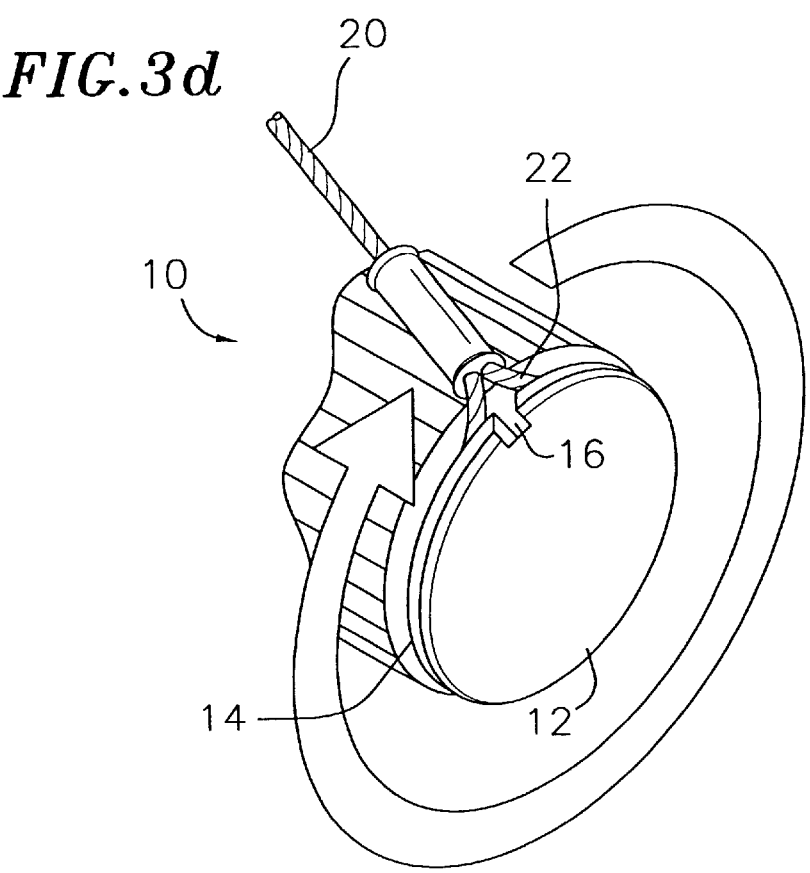

Referring now to FIGS. 3c and 3d, when a single rotation is almost complete, the majority of the preformed loop 22 has been guided into the groove 14 and a small segment remains outside of the groove 14. As the rotation completes, the portion of the preformed loop 22 remaining outside of the groove 14 disengages from the slot 16 and proceeds into the groove, so that the entire preformed loop 22 is inside the groove 14. In embodiments that use flexible nylon coated wire lanyards, the preformed loop 22 disengages from the slot 16 and proceeds into the groove 14 because the crimping sleeve creates a loop that is not exactly circular. In embodiments utilizing plastic lanyards, such as the lanyard shown in FIG. 2b with circular preformed loops 22, the elastic properties of the plastic enable the preformed loop 22 to disengage from the slot 16 and proceed into the groove 14.

The preformed loop 22 can be detached by performing the above process in reverse. Due to the fact that the preformed loop 22 must be placed in the slot 16 for detachment to occur, the attachment assembly can be designed to virtually eliminate the possibility that the preformed loop 22 will detach during the regular usage of the dust cover 10.

Referring again to FIG. 1 and FIG. 2a in addition to FIGS. 3a–3d, the ability to attach the preformed loop 22 to the dust cover 10 using the dust cover attachment assembly of the present invention is dependent on the angle 18 of the slot 16 relative to the dust cover center line, the width of the slot 16 (shown as "s" in FIG. 1), the internal diameter of the preformed loop 22 when it is substantially formed as a circle as shown by the imaginary line 26 of FIG. 2a, the diameter of the flange 12 (shown as "D" in FIG. 1), the width of the flange 12 (shown as "f" in FIG. 1), the hub diameter "d" of the groove 14, the width of the groove 14 (shown as "g" in FIG. 1) and the materials used to construct the dust cover 10 and the lanyard 20.

In one preferred embodiment of the dust cover 10, it is constructed from anodized aluminum and the preformed loop 22 and lanyard 20 are constructed using nylon coated wire. The angle of the slot 18 is 45°, the width "s" of the slot is 0.065 in, the internal diameter of the preformed loop 22 of the lanyard 22 is 1.0 in, when it is substantially formed as a circle as shown by the imaginary line 26 of FIG. 2a, the diameter "D" of the flange 12 is 1.2 in, the width "f" of the flange 12 is 0.08 in and the hub diameter "d" of the groove 14 is 0.99 in.

Figure 4A:
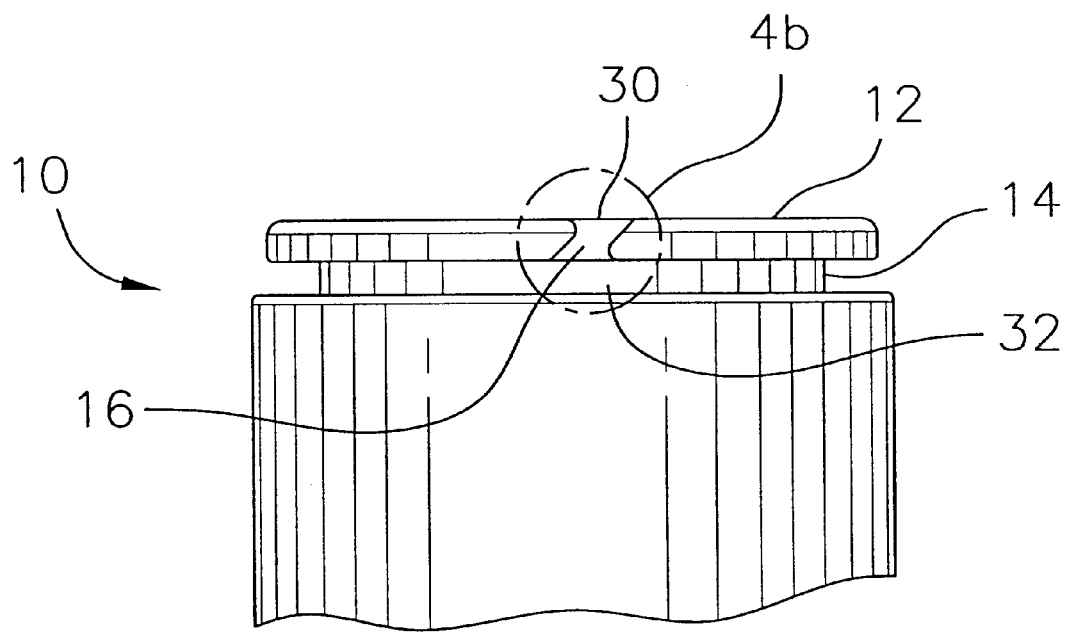
FIG. 4a is a semi-schematic side elevational view of a dust cover including a groove and a flange with a slot therein.
Figure 4B:
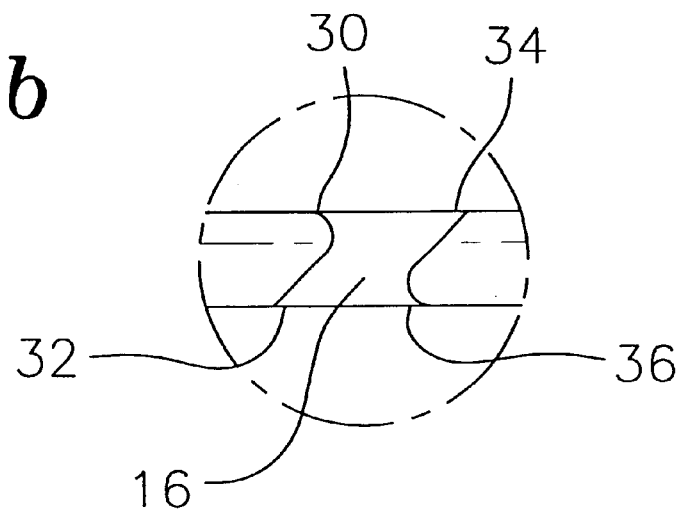

Turning now to FIGS. 4a and 4b, in one embodiment of the dust cover 10 of the present invention, the slot 16 has an outside leading edge 30, an inside leading edge 32, an outside trailing edge 34 and an inside trailing edge 36. The outside leading edge 30 and inside trailing edge 36 are rounded.

Referring again to FIGS. 1 and 3a–3d in addition to FIGS. 4a and 4b, decreasing the angle 18 of the slot 16 causes the preformed loop 22 of the lanyard 20 to catch against the outside leading edge 30 and the inside trailing edge 36 of the slot as the lanyard is being guided into groove 14. Catching of the preformed loop 22 of the lanyard 20 against the edges of the slot 16 can be alleviated by reducing the width "f" of the flange 12, increasing the width "g" of the groove 14 or decreasing the friction between the attachment assembly and the preformed loop 22.

Increasing the angle of the slot 18 increases the ease with which the preformed loop 22 can be attached to the dust cover 10 using the dust cover attachment assembly provided in accordance with practice of the present invention. However, two problems result when the angle 18 is increased. The first is that the outside leading edge 30 and the inside trailing edge 36 of the slot 16 can cut into the preformed loop 22 as it is being attached to the dust cover 10, causing the loop 22 to break. A closer inspection of FIG. 4b reveals that the outside leading edge 30 and inside trailing edge 36 of the slot 16 are rounded to prevent breakage from occurring. The extent of the required rounding increases as the angle 18 of the of the slot 16 increases.

The second problem that arises from increasing the angle and thus increasing rounding is that the rounding increases the width "s" of the slot 16 at its opening into the groove 14. Increasing the width "s" of the slot 16 opening increases the likelihood that the preformed loop 22 will inadvertently detach from the dust cover 10, because the greater the slot width "s" the more likely a portion of the preformed loop 22 of the lanyard 20 will enter the slot. Once the preformed loop 22 has entered the slot 22, then rotation of the preformed loop relative to the attachment assembly can result in the detachment of the preformed loop from the attachment assembly. For example, the preformed loop 22 can inadvertently detach if a portion of the preformed loop proceeds into the slot 16 and then the preformed loop is rotated relative to the dust cover 10 in a direction opposite to the direction of rotation shown in FIGS. 3a–3d causes the loop to slide through the slot and off the attachment assembly.

The minimum width "s" of the slot 16 is constrained by the width of the material used to construct the lanyard 20. When the slot angle 18 is large, unwanted detachment can be avoided by increasing the friction between the preformed loop 22 and the attachment assembly. Increasing the friction has the effect of requiring a greater force be used to detach the preformed loop 22 and reduces the likelihood of use of the dust cover 10 resulting in detachment of the preformed loop from the attachment assembly. In alternative embodiments of the dust cover constructed from the same materials and with the same dimensions as the embodiment described above, acceptable performance was achieved for slot angles 18 in the range of 30° to 60°.

Other factors that influence the ease with which the attachment assembly enables the preformed loop 22 of a lanyard 20 to be attached to or detached from the dust cover 10 include the hub diameter "d" of the groove 14 and the internal diameter of the preformed loop 22. Increasing the hub diameter "d" of groove 14 has the effect of requiring more force to attach and detach the preformed loop 22 using the attachment assembly of the dust cover. Conversely, increasing the internal diameter of the preformed loop 22 has the effect of requiring less force to attach and detach the preformed loop 22 of the lanyard 20 using the attachment assembly.

In an alternative embodiment of the dust cover in accordance with practice of the present invention, the plastic lanyard 20' of FIG. 2b is attached to the dust cover using the attachment assembly. The material used to construct the plastic lanyard 22 is chosen such that it has a flexural modulus large enough to enable the preformed loop 22 to be deformed to lift out of the slot 16 during attachment, but small enough to prevent the preformed loop 22 from detaching from the dust cover 10 without proceeding through the slot 16 of the attachment assembly. For the preferred embodiment of the dust cover 10 described above, a lanyard 20' with a circular preformed loop 22' constructed from a material having a flexural modulus in the range of 330–420 kilo pounds per square inch ("kpsi") can be used, such as an injection molded lanyard constructed from engineering grade nylon 6/6, which has a flexural modulus of 380 kpsi.

Plastics with a flexural modulus lower than 330 kpsi can be used. However, a plastic lanyard constructed from a material with a flexural modulus lower than 330 kpsi and a circular preformed loop 22 cannot be used in combination with the dust cover 10 described above because the preformed loop could not be deformed to lift out of the slot 16 during attachment. A plastic lanyard constructed from a material with a flexural modulus lower than 330 kpsi and constructed to have a non-circular shape similar to the shape of the preformed loop of the flexible lanyard shown as 22 in FIG. 2A can be used in combination with the dust cover 10 described above, because the irregular shape enables the preformed loop to lift out of the slot during attachment.

Although the embodiments recited above relate to the attachment of a preformed loop to a dust cover, the methods and techniques described above are equally adaptable to the attachment of a preformed loop to any structure having a groove and a flange with a slot in it. In other embodiments, the attachment assembly can be used to attach preformed loops to a wide variety of objects including covers for containers, computers, luggage, merchandise, clothing, shoes, buildings, seagoing vessels or any other object that requires the attachment of a lanyard.

While the above description contains many specific features of the invention, these should not be construed as limitations on the scope of the invention, but rather as an example of one preferred embodiment thereof. Many other variations are possible. Accordingly, the scope of the invention should be determined not by the embodiments illustrated, but by the appended claims and their legal equivalents.

What is claimed is:

1. A structure for attaching a preformed loop having an internal diameter and an external diameter to a dust cover comprising:
   a flange located in a first plane;
   a groove having an outer peripheral surface adjacent the flange;
   a slot in the flange disposed at an angle to the first plane;
   wherein the flange is a disk with diameter greater than the internal diameter of the preformed loop;
   wherein the groove is circular with diameter less than the selected internal diameter of the preformed loop;
   wherein the groove is aligned in a plane substantially parallel to the first plane;
   wherein the flange, the groove and the slot enable the preformed loop to be guided into the groove by rotation of the loop relative to the device; and
   wherein the outer peripheral surface of the groove is contained within the interior diameter of the preformed loop.

2. The structure of claim 1, wherein the angle of slot is substantially 45°.

3. A device configured for attaching a preformed loop having an internal diameter and an external diameter thereto, the device comprising:
   a flange located in a first plane;
   a groove having an outer peripheral surface adjacent the flange;
   a slot in the flange disposed at an angle to the first plane;
   wherein the flange is a disk with a diameter greater than the internal diameter of the preformed loop;
   wherein the groove is circular with a diameter less than the internal diameter of the preformed loop;
   wherein the groove is aligned in a plane substantially parallel to the first plane;
   wherein the flange, the groove and the slot enable the preformed loop to be guided into the groove by rotation of the loop relative to the device; and
   wherein the outer peripheral surface of the groove is contained within the interior diameter of the preformed loop.

4. The device of claim 3, wherein said angle at which the slot is disposed to the first plane is 45°.

5. A structure for attaching a preformed loop having an internal diameter and an external diameter to a dust cover, the structure comprising:
   a flange located in a first plane;
   a groove having an outer peripheral surface adjacent the flange;
   a slot in the flange disposed at an angle to the first plane;
   wherein the flange, the groove and the slot enable the preformed loop to be guided into the groove by rotation of the loop relative to the device; and
   wherein the outer peripheral surface of the groove is contained within the interior diameter of the preformed loop.

6. The structure of claim 5, wherein the shapes of the flange, the groove and the slot substantially prevent unwanted detachment of the preformed loop from the groove.

7. The structure of claim 6, wherein the slot includes an edge that is de-burred to prevent shearing of the preformed loop.

8. A device configured for attaching a preformed loop having an internal diameter and an external diameter thereto, the device comprising:
   a flange located in a first plane;
   a groove having an outer peripheral surface adjacent the flange;
   a slot in the flange disposed at an angle to the first plane;
   wherein the flange, groove and the slot enable the preformed loop to be guided into the groove by rotation of the loop relative to the device; and
   wherein the outer peripheral surface of the groove is contained within the interior diameter of the preformed loop.

9. The device of claim 8, wherein the flange, the groove and the slot are configured to substantially prevent unwanted detachment of the preformed loop from the groove.

10. The device of claim 9, wherein the slot includes an edge that is de-burred to prevent shearing of the preformed loop.

11. The device of claim 8 additionally including a preformed loop attached thereto, wherein:
    the preformed loop is circular and constructed from an elastic material having a flexural modulus;
    wherein the flexural modulus of the elastic material enables the preformed loop to be guided into the groove by rotation of the loop relative to the structure; and
    wherein the flexural modulus of the elastic material substantially prevents unwanted detachment of the preformed loop.

12. The device of claim 11, wherein the elastic material is engineering grade nylon 6/6.

13. The device of claim 8 additionally including a preformed loop attached thereto, wherein the preformed loop is formed from a flexible wire.

14. A method of attaching a preformed loop to a dust cover comprising the steps of:
    placing a segment of a preformed loop inside a slot in a flange of the dust cover, the dust cover having a flange in a first plane, a groove having an outer peripheral surface, the groove being proximate to the flange, and a slot in the flange disposed at an angle to the first plane; and
    completing at least one full rotation of the preformed loop relative to the dust cover so that the slot guides the preformed loop into the groove and the outer peripheral surface of the groove is contained within the preformed loop.

15. The method of attaching a preformed loop in claim 14, wherein the direction of the rotation is determined by the angle of the slot relative to the first plane.

16. A method of attaching a preformed loop to a structure comprising the steps of:

placing a segment of a preformed loop inside a slot in a flange of a structure, the structure having a flange in a first plane, a groove having an outer peripheral surface, the groove being proximate to the flange, and the slot in the flange disposed at an angle to the first plane; and completing at least one full rotation of the preformed loop relative to the structure so that the slot guides the preformed loop into the groove and the outer peripheral surface of the groove is contained within the preformed loop.

17. The method of attaching a preformed loop in claim 16, wherein the direction of the rotation is determined by angle of the slot relative to the first plane.

18. The structure of claim 17, wherein:

the preformed loop is circular and constructed from an elastic material;

wherein the flexural modulus of the elastic material enables the preformed loop to be guided into the groove by rotation of the loop relative to the dust cover; and wherein the flexural modulus of the elastic material substantially prevents unwanted detachment of the preformed loop.

19. The structure of claim 18, wherein the elastic material is engineering grade nylon 6/6.

\* \* \* \* \*